United States Patent
Gill et al.

(10) Patent No.: US 11,788,652 B2
(45) Date of Patent: Oct. 17, 2023

(54) SLOTTED AND SLIT JOINTS

(71) Applicant: AVTECHTYEE INC., Everett, WA (US)

(72) Inventors: Justin Edward Gill, Ocean Shores, WA (US); Matthew Charles Sheldon Greenstreet, Bothell, WA (US); Glenn B. Newell, Marysville, WA (US)

( * ) Notice: Subject to any disclaimer, the term of this patent is extended or adjusted under 35 U.S.C. 154(b) by 651 days.

(21) Appl. No.: 16/601,477

(22) Filed: Oct. 14, 2019

(65) Prior Publication Data
US 2021/0108745 A1 Apr. 15, 2021

(51) Int. Cl.
*F16L 21/00* (2006.01)
*B29C 65/56* (2006.01)
*B29C 65/48* (2006.01)

(52) U.S. Cl.
CPC ............ *F16L 21/007* (2013.01); *B29C 65/48* (2013.01); *B29C 65/56* (2013.01)

(58) Field of Classification Search
CPC ..... B29C 66/5221; B29C 66/53; B29C 66/55; B29C 66/61; B29C 66/63
See application file for complete search history.

(56) References Cited

U.S. PATENT DOCUMENTS

| 4,848,957 A | 7/1989 | Umeda |
| 9,803,799 B1 * | 10/2017 | Yang .................. F16M 11/2064 |
| 2017/0356583 A1 | 12/2017 | Gill et al. |

FOREIGN PATENT DOCUMENTS

| DE | 40 29 008 C1 | 10/1991 |
| WO | WO 2017/117497 A1 | 7/2017 |

OTHER PUBLICATIONS

International Search Report and Written Opinion issued in corresponding PCT Application No. PCT/US20/55389, dated Jan. 29, 2021, 13 pages.

\* cited by examiner

*Primary Examiner* — Christopher T Schatz
(74) *Attorney, Agent, or Firm* — LEWIS ROTHGERBER CHRISTIE LLP

(57) ABSTRACT

A method of forming a tube assembly includes forming arms on a tube end portion by forming a plurality of slots or slits on such tube end and mating such arms with a tapered outer surface of a fitting. The fitting may include at least one annular step mated with an annular step formed on the tube inner surface.

17 Claims, 5 Drawing Sheets

SLOTTED AND SLIT JOINTS

BACKGROUND OF INVENTION

The present disclosure relates generally to composite tube assemblies and more particularly to composite tube assemblies having form locking fittings.

Composite materials offer high stiffness and/or strength-to-weight ratios. Composite tube assemblies are formed from composite materials and are used for transferring loads in structures such as aircraft or spacecraft. Other applications include control rods, containers, ducts, panel inserts, torque tubes, etc.

In vehicles such as aircraft, it is beneficial to use composite tube assemblies rather than assemblies primarily composed of metal. They are lighter and stronger than comparable metal tube assemblies. The composite tube assemblies typically incorporate carbon fiber ("CF") tubes and are lighter in weight, more resistant to corrosion, stronger and more inert relative to substantially metallic tube assemblies. Composite tube assemblies may be used in an overhead luggage bin (or stow bin) assemblies in an aircraft to provide structural support both when the bin is in an open configuration and when it is closed. The composite tube assemblies may also be used as structural members in vehicle frames.

To form the end of a CF tube around a fitting or insert (individually and collectively referred to herein for convenience as "fitting"), such as a Hylock insert, the composite tube end is compressed over a smaller diameter of the fitting to form the composite tube assembly. When doing so, areas of the compressed end of the composite tube bunch up and need to be accommodated or removed. This bunching up of the composite tube end can result in cracked CF material after forming. The compressed and bunched composite tube end then requires post processing to clean up the formed area, which adds complexity and risk to the manufacturing process. Other forming issues are seen with tubes formed from composite materials having higher cure temperature resins, as it is more difficult to achieve the glass transition temperature (Tg) range of such composite materials and thus, it is more difficult to compress such tube ends over the fitting.

SUMMARY OF THE INVENTION

A method for forming a composite tube assembly includes obtaining a composite tube including an end, where the composite tube is formed from fibers and resin. The composite tube also includes an end portion extending to the end including a plurality of axial slots. Each of the axial slots includes a two edges at the outer surface of the tube end extending along the length each slot. The slots define a plurality of arms on the end portion. The method also includes obtaining a fitting including a first end opposite a second end. The fitting also includes an annular tapered outer surface tapering from a first diameter at, or proximate, the first end to a second diameter, such that the first diameter is greater than the second diameter. The method further includes placing the tapered outer surface of the fitting in the tube end portion such that second diameter of the fitting outer surface is at, or proximate, the end of the tube and the first diameter of the fitting annular tapered outer surface is further into the tube than the second diameter of the fitting annular tapered outer surface. The method also includes radially compressing each of the arms over the fitting annular tapered outer surface, such that the two edges of each slot do not overlap each other, and connecting or adhering each of the arms to the fitting tapered outer surface. In another example embodiment, the method further includes placing a bolstering structure, or a collar, over the arms for retaining the arms against the tube tapered outer surface. In yet another example embodiment, each slot has a constant width along its entire, or substantially, its entire length. In an example of this embodiment, the width, $W=(C_{max}-C_{min})/N$, where W is the width, $C_{max}$ is the maximum circumference of fitting tapered outer surface, $C_{min}$ is the minimum circumference of the tapered outer surface, and N is the number of slots. In a further example embodiment, the width is within 25% of a calculated width, W. In yet a further example embodiment, the width is within 20% of a calculated width, W. In one example embodiment, the width is within 15% of a calculated width, W. In another example embodiment, the width is within 10% of a calculated width, W. In yet another example embodiment, the width is within 5% of a calculated width, W.

In another example embodiment, each slot is triangular in plan view, where a width of the slot decreases in a direction toward the end of the tube. In another example embodiment, where each slot is triangular in plan view, the width, $W_x$ of each slot of the plurality of slots as a function of length, X, is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, L is the length of the slot, and W is calculated by the formula $W=(C_{max}-C_{min})/N$, where $C_{max}$ is the maximum circumference of fitting tapered outer surface, while $C_{min}$ is the minimum circumference of the tapered outer surface, and N is the number of slots. In yet another example embodiment where each slot is triangular in plan view, the width, $W_x$ of each slot of the plurality of slots as a function of length, X is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, where L is the length of the slot, and where W is within of 25% of the width, $W_c$ calculated by the formula $W_c=(C_{max}-C_{min})/N$, where $C_{max}$ is the maximum circumference of fitting tapered outer surface, while $C_{min}$ is the minimum circumference of the tapered outer surface, and N is the number of slots. In a further example embodiment where each slot is triangular in plan view, the width, $W_x$ of each slot of the plurality of slots as a function of length, X is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, where L is the length of the slot, and where W is within of 20% of the width, $W_c$ calculated by the formula $W_c=(C_{max}-C_{min})/N$, where $C_{max}$ is the maximum circumference of fitting tapered outer surface, while $C_{min}$ is the minimum circumference of the tapered outer surface, and N is the number of slots. In yet a further example embodiment where each slot is triangular in plan view the width, $W_x$ of each slot of the plurality of slots as a function of length, X is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, where L is the length of the slot, and where W is within of 15% of the width, $W_c$ calculated by the formula $W_c=(C_{max}-C_{min}) N$, where $C_{max}$ is the maximum circumference of fitting tapered outer surface, while $C_{min}$ is the minimum circumference of the tapered outer surface, and N is the number of slots. In another example embodiment where each slot is triangular in plan view, the width, $W_x$ of each slot of the plurality of slots as a function of length, X is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, where L is the length of the slot, and wherein W is within of 10% of the width, $W_c$ calculated by the formula $W_c=(C_{max}-C_{min})/N$, where $C_{max}$ is the maximum circumference of fitting tapered outer surface, while $C_{min}$ is the minimum circumference of the tapered outer surface, and N is the number of slots. In yet another example embodiment where each slot is triangular in plan view, the width, $W_x$ of each slot of the plurality of slots as a function of length, X is calculated by the formula $W_x=W-2*X*\tan(\Theta)$, where W is the width at the distal edge of the slot, $\Theta$ is the angle between the two opposite edges of the slot and can be calculated by the formula $\Theta=2*\tan^{-1}(LW/2)$, where L is the length of the slot, and wherein W is within of 5% of the width, $W_c$ calculated by the formula $W_c=(C_{max}-C_{min})/N$, where $C_{max}$ is the maximum circumference of fitting tapered outer surface, while $C_{min}$ is the minimum circumference of the tapered outer surface, and N is the number of slots.

In another example embodiment, a width $W_x$ of each slot of the plurality of slots as a function of its length, X is calculated by the formula $W_x=(C_{max}-C_x)/N$, where Cmax is the maximum outer surface circumference of the tapered outer surface of the fitting, Cx is circumference of the fitting at a distance X as measured from the proximal apex of the slot when the fitting is properly fitted within the tube and N is the number of slots. In another example embodiment, the width of the fitting at the distance X is within 25% of the calculated width $W_x$. In yet another example embodiment, the width of the fitting at the distance X is within 20% of the calculated width $W_x$. In a further example embodiment, the width of the fitting at the distance X is within 15% of the calculated width $W_x$. In yet a further example embodiment, the width of the fitting at the distance X is within 10% of the calculated width $W_x$. In an example embodiment, the width of the fitting at the distance X is within 5% of the calculated width $W_x$.

In another example embodiment, the width of each slot varies linearly along the length of such slot. In yet another example embodiment, the width of each slot varies non-linearly along the length of such slot.

In an example embodiment and in any of the aforementioned embodiments, the fitting includes at least one annular step at or proximate the first end of the fitting and the tube includes an inner surface including an annular step, the method further includes mating the tube inner surface annular step to the fitting at least one annular step. In another example embodiment, the fitting at least one annular step is a plurality of adjacent steps.

In a further example embodiment, a method for forming a composite tube assembly includes obtaining a composite tube comprising an end, where the composite tube is formed from fibers and resin, and includes an end portion extending to the end. The tube also includes an inner surface having one annular step. The method also includes obtaining a fitting including a first end opposite a second end, and an annular tapered outer surface tapering from a first diameter at proximate the first end to a second diameter, such that the first diameter is greater than the second diameter. The fitting also includes at least one annular step at, or proximate, the first end of the fitting. The method further includes placing the annular tapered outer surface of the fitting in the tube end portion mating the tube inner surface annular step to the fitting at least one annular step, such that the second diameter of the fitting outer surface is at, or proximate, the end of the tube and the first diameter of the fitting annular tapered outer surface is further into the tube than the second diameter of the fitting annular tapered outer surface. The method further includes radially compressing the end portion of the tube over the fitting annular tapered outer surface, and connecting and adhering the radially compressed end portion of the tube to said fitting tapered outer surface. In yet another example embodiment, the fitting at least an annular step is a plurality of adjacent steps.

In an example embodiment, a composite tube assembly includes a fitting including a tapered outer surface, and a first end opposite a second end. The fitting tapered outer surface extends from, or proximate, the first end toward the second end of the fitting, and the fitting also includes at least one annular step formed on the outer surface at, or proximate, the first end. A composite tube end extends over and is mated with the fitting tapered outer surface. The tube includes an annular step formed on its inner surface that is mated with the at least one annular step formed on the fitting. In another example embodiment, the fitting at least one annular step is a plurality of adjacent annular steps.

DESCRIPTION OF THE DISCLOSURE

Figure 1:
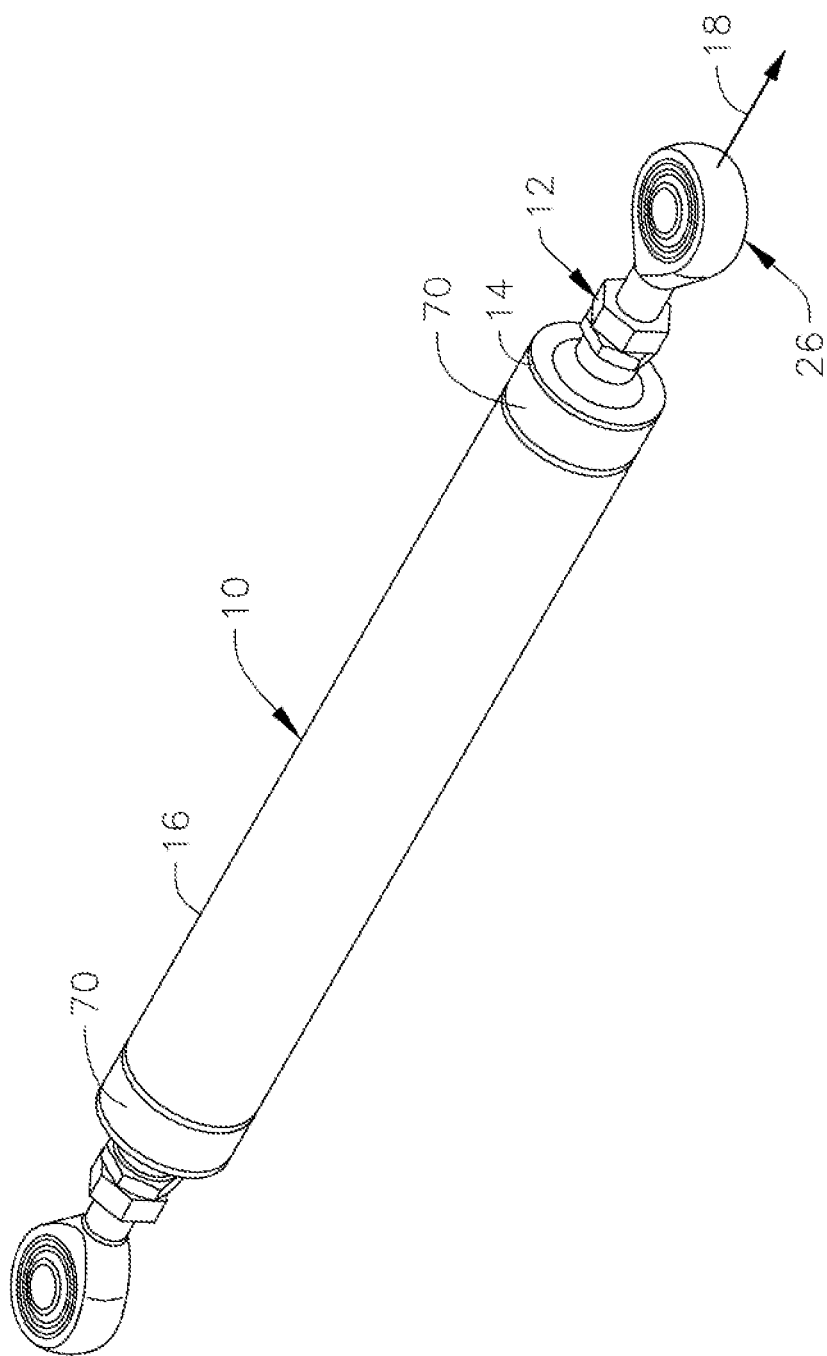
FIG. 1 is a perspective view of an example embodiment composite tube assembly.

Composite tube assemblies 10 including fittings 12 are described in U.S. Pat. No. 8,205,315, the contents of which are fully incorporated herein by reference. In an example embodiment, an end 14 of a composite tube or tube 16 is fitted over a fitting 12 as shown in FIG. 1. The composite tube 16 may be produced by winding composite fibers in a form of a filament (and/or a tape) having an epoxy resin over a tubular mandrel. Any of a number of suitable machines known to those skilled in the art can be used for this purpose. The composite tube may be a fiber reinforced composite formed with a thermoset or a thermoplastic resin. In other example embodiments, the composite tube may be a liquid molded tube that may include fiber reinforcement. The composite fibers may be wound along a direction that is substantially helical with respect to a longitudinal axis 18 of the composite tube. In other words, in a direction along the circumference transverse or perpendicular to the longitudinal axis of the tube. In one embodiment, the composite fibers are also wound at a very small helical angle (or angles) with respect to the longitudinal axis. However, embodiments of the composite tube 16 are not limited thereto. That is, the composite tube 16 may be produced by winding filaments and/or pre-impregnated composite tapes in any known manner and at any angle. The composite tube may include fibers oriented in multiple directions, as for example in the hoop direction (90° to the longitudinal axis) as well as fibers along the longitudinal axis as well as other angles relative to the longitudinal axis, as for example along 45°.

Figure 2:
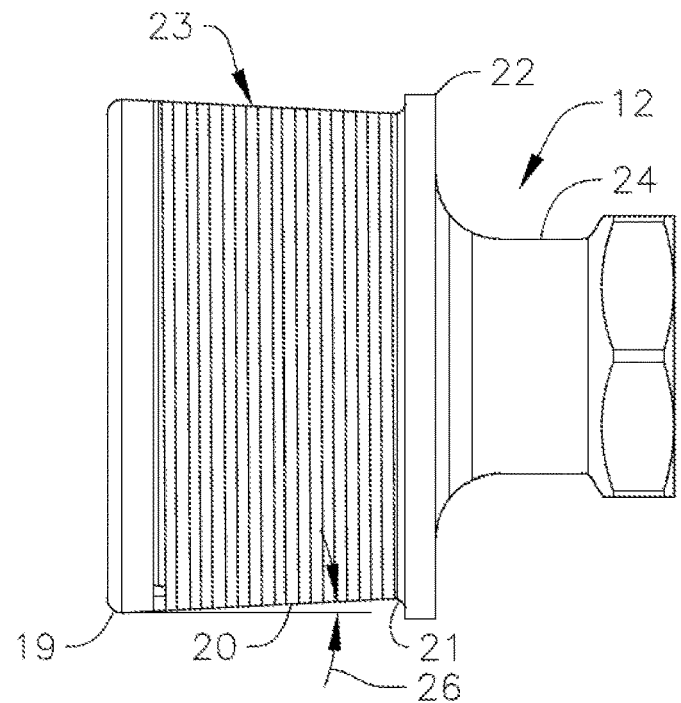
FIG. 2 is a side view of an example embodiment fitting that may be incorporated in the composite tube assembly shown in FIG. 1.
Figure 3:
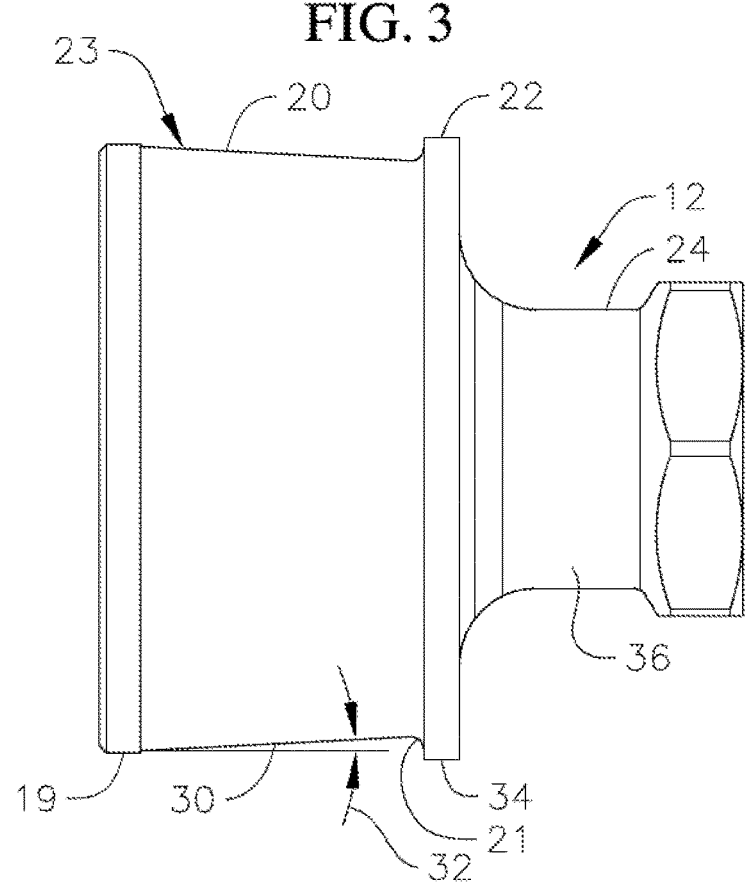
FIG. 3 is a side view of another example embodiment fitting that may be incorporated in the composite tube assembly shown in FIG. 1.

The fitting 12 includes a tapered outer surface 20, as for example shown in FIGS. 2 and 3, tapering from a larger diameter section 19 to smaller diameter section 21 distally relative to the tube 16 defining reduced diameter or tapered portion 23. The tapered outer surface 20 may have a smooth outer surface as for example shown in FIG. 3 or may have a textured outer surface, as for example shown in FIG. 2, for better adhesion. In an example embodiment, the textured outer surface may be formed by a plurality of adjacent annular grooves. In other example embodiments, the outer surface may have multiple tapering outer surfaces, as for example shown in FIG. 6A. For example, a first cylindrical outer surface 42 may axially taper at a first angle 44. A second cylindrical outer surface 46, extending axially from the first cylindrical outer surface, may taper axially at a second angle 48 greater than the first angle 44 such that it tapers to a smaller diameter in a direction away from the first cylindrical outer surface. Fittings also typically include a cylindrical flange 22 proximate the smaller diameter of the tapering outer surfaces. A neck 24 extends axially from the flange in a direction away from the tapering outer surface. An end fitting, such a clevis bolt 26, may be received in the neck and connect to the fitting, as for example shown in FIG. 1.

Figure 4A:
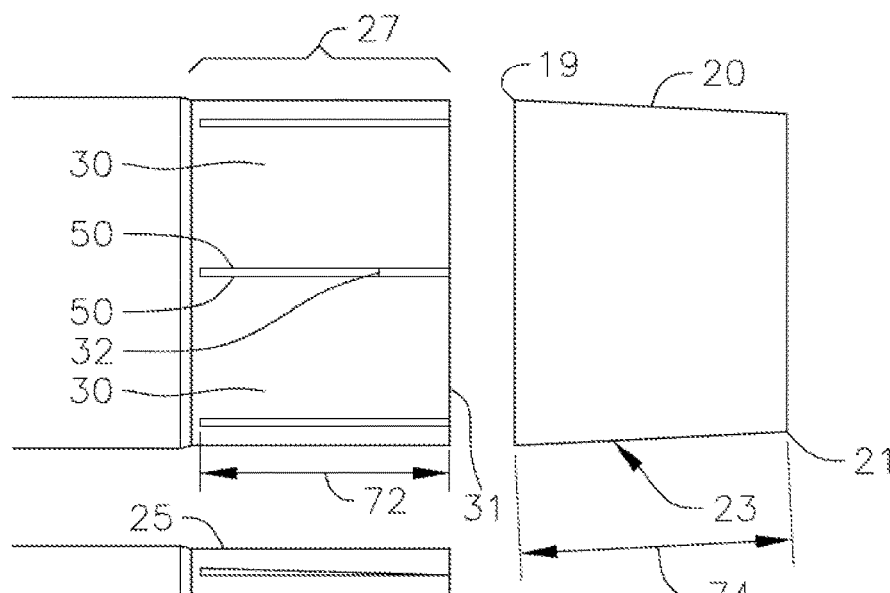
FIG. 4A is a schematically depicted side exploded view of an example embodiment slotted tube end portion and partially depicted fitting.

In an example embodiment, a tube end portion 27, to be fitted over (i.e., mated with) the tapered outer surface 20 of the fitting, is slotted with a slot 32, in at least one location but, preferably in at least at two different locations to form at least two cantilevered arm sections or arms 30 as for example shown in FIG. 4A. For illustrative purposes, only the tapered portion 23 of the fitting is schematically depicted next to the tube end portion 27 in FIG. 4A. Each slot 32 extends to the distal end 31 of the tube so as to form the cantilevered arms 30. In an example embodiment, more than two slots are formed as for example three, four, five, six, seven, eight, nine, ten, or more than ten to form multiple arms 30. These arms are bent and molded over the tapered surface of the fitting for coupling the tube to the fitting, as for example shown in FIG. 4B which depicts the end portion of the tube fitted over the tapered outer surface of the fitting without showing the fitting.

A tapered portion 25 of the composite tube 10 is formed by heating the end portion 27 arms 30 of the composite tube 16, into which the fitting 12 was inserted, to a temperature sufficient for the composite tube end portion arms to become thermoplastic or moldable, as for example by softening the resin forming the composite tube. In one example embodiment, the tube is heated to a temperature within the glass transition temperature ($T_g$) range of the composite material forming the composite tube. A heated die or any other suitable instrument may be used for this purpose. Once the end portion 27 arms 30 of the composite tube 16 are in a moldable state, they are then pressed and deformed to engage the tapered portion 23 of the fitting 12. That is, the end portion 27 arms 30 of the composite tube 16 are deformed to collectively have a shape and dimension substantially conforming to a shape and dimension, respectively, of the tapered portion 23 of the fitting 12. The tapered portion 25 of the composite tube 16 is thereby formed. As the tapered portion 25 of the composite tube 16 cools, it compresses radially on to the tapered portion 23 of the fitting 12. The tapered portion 25 of the composite tube 16 is thereby secured to the tapered portion 23 of the fitting 12 to form a mechanical lock. The tapered portion 25 of the composite tube 16 may also bond to the tapered portion of the fitting 12 as the softened resin cools and bonds onto the tapered portion of the fitting. An adhesive may also be used to help adhere the composite tube reduced diameter portion 25 to the fitting tapered portion 23. If an adhesive is used between the composite tube and the fitting, the adhesive by itself or in combination with the resin creates a bond between the composite tube and the fitting.

Figure 7A:
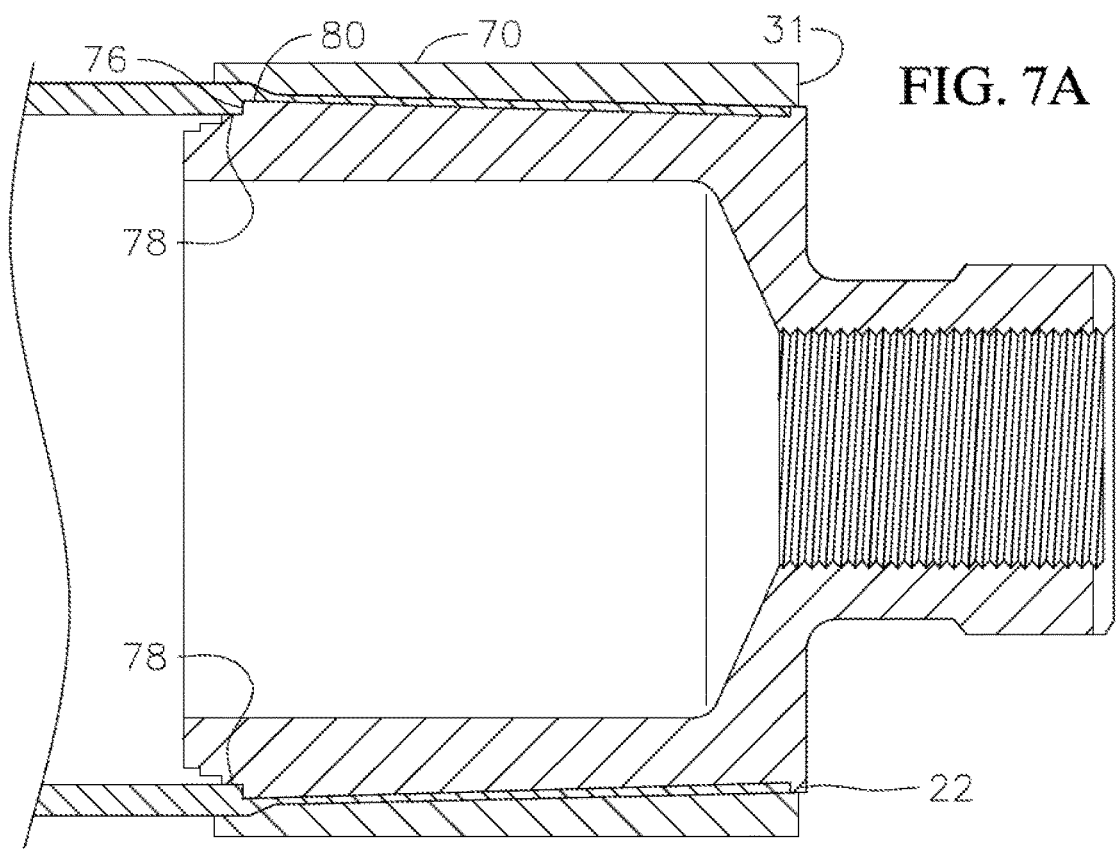
FIG. 7A is a partial cross-sectional view of an example embodiment tube assembly.
Figure 7B:
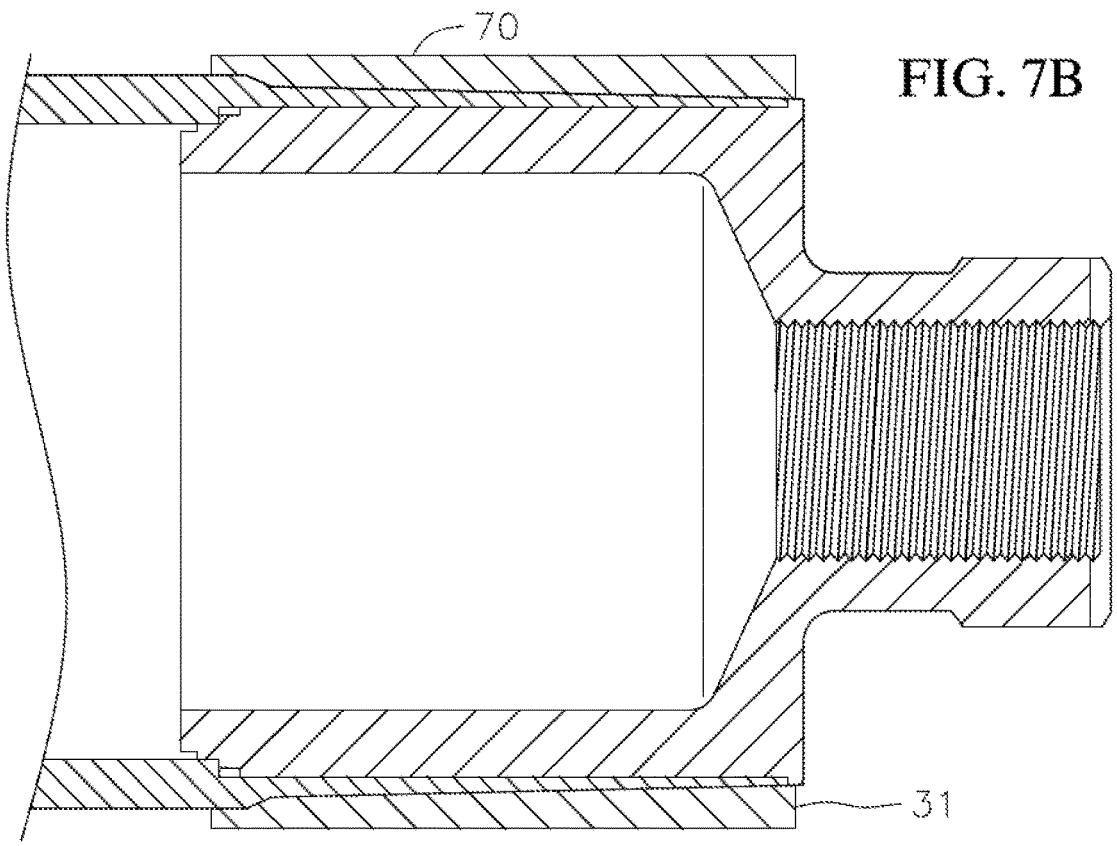
FIG. 7B is a partial cross-sectional view of another example embodiment tube assembly.

Applicants discovered multiple benefits by slotting (i.e. forming slots 31) or slitting the tube end portion when forming a composite tube assembly. Because the arms 30 provide flexibility (i.e., they are more flexible then the composite tube end portion when not slotted), heat, although desirable, is not necessary for bending each arm and attaching and coupling it to the tapered outer surface of the fitting. Heat is, however, desirable for accelerating the cure of the structure adhesive used on the composite tube and thus the arms. The heating temperature can range anywhere from ambient temperate to the upper end of the composite tube material $T_g$ range. Since the slotted tube end portion configuration defining multiple arms also allows for ambient temperature forming or bending of the arms onto the tapered outer surface 20 of the fitting, a collar 70 may be installed over the arms to provide appropriate force on the arms against the tube to provide a forming force in the tube without having to heat the arms (FIGS. 1, 7A and 7B). Another benefit provided by lower temperature forming is the ability to maintain tolerances caused coefficient of the thermal expansion differences in the materials used for the tube and the fitting. Another benefit is the ability to use tooling made for materials that would otherwise degrade at the higher forming temperatures. Being able to use lower temperature forming, further provides a great benefit, in that it allows composite tubes made from materials with higher $T_g$ to be used as the higher temperatures required when using traditional forming methods with many materials are not necessary.

Since the hoop structure is cut to form the slots and arms, composite materials may be used to form the composite tube that typically do not form very well. This include standard, or intermediate, or high or ultra-modE fibers and resins systems with high $T_g$, even with $T_g$ significantly over 350° F. These include thermoplastic or thermoset matrix materials.

In the prior art embodiments, where slots were not formed, the bunching up of the material after the end of the tube was compressed over the tapered surface, and required machining away of the excess material. Material then had added to the outer diameter of the tube. Such machining and addition of material is not required by slotting and forming arms on the composite tube end portion.

In an example embodiment, the slotted ends of the tube may be formed in the prepreg material prior to rolling to form the tube or may be forming to the other tube after the tube is formed.

In an example embodiment, each slot has a length 72 such that when the arms are mounted to the tapered outer surface of the fitting, each slot extends along the entirety, or substantially the entirety, of the length 74 of the fitting annular tapered outer surface 20. In other example embodiments, the length of each slot may be less than the entire length of the tapered outer surface 20.

Figure 4B:
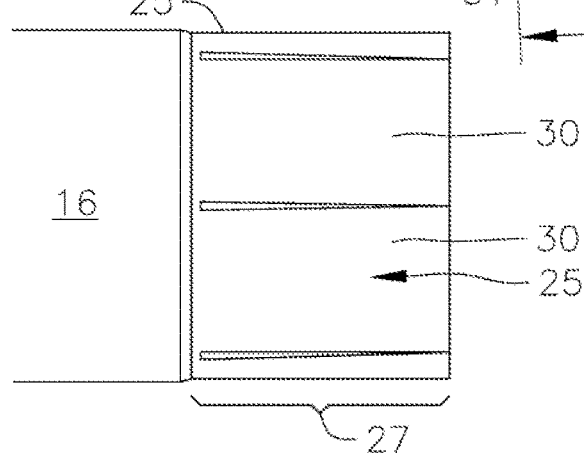
FIG. 4B is a schematically depicted side view of the tube end portion shown in FIG. 4A when mated to a tapered outer surface of a fitting such as the partially shown fitting depicted in FIG. 4A.
Figure 5A:
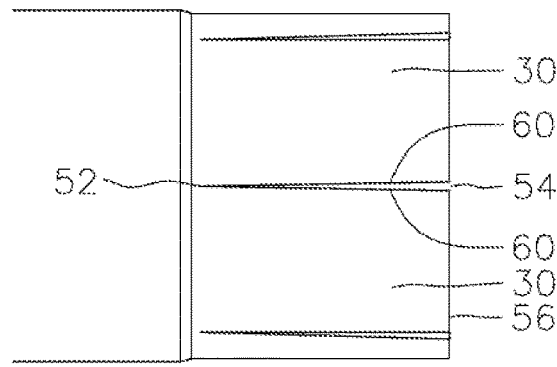
FIG. 5A is a schematically depicted side view of another example embodiment slotted tube end portion.
Figure 5B:
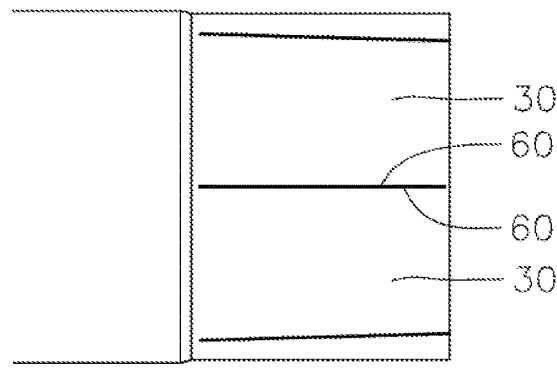
FIG. 5B is a schematically depicted side view of the tube end portion shown in FIG. 5A when mated to a tapered outer surface of a fitting.

In one example embodiment, each slot is rectangular shaped in that each slot includes generally parallel, or parallel, opposite edges 50 extending along the entire length, or substantially the entire length, of each slot, as for example shown in FIG. 4A. When fitted and mated with the tapered outer surface of the fitting, the arms 30 shown in FIG. 4A define a shape as shown in FIG. 4B. In another example embodiment as shown in FIG. 5A, each slot 32 is triangularly shaped, such that the vertex 52 of the triangle is proximal and the base 54 of the triangle is distal of the tube 16 defining the maximum spacing of the slot, or the maximum width of the slot, at the distal end 56 of the tube such that the largest width of the slot is closest to the smallest diameter section 21 of the tapered surface 20 of the fitting when the fitting if fitted in the tube end. In other example embodiments, the slots may have nonlinear or varying widths to accommodate different geometries of tapering of the surface of the fitting, as for example shown in FIG. 6A. For example, the slots may have varying widths such that the slot width varies along two different angles so that the arms 30 formed can mate with a fitting that has a first tapered surface 42 tapering at a first angle 44 and a second tapered surface 46 extending axially from for the first tapered surface and extending at a second angle 48 that is greater than the first angle, as for example shown in FIG. 6A. In an example embodiment, the edges of each slot are curving or continuously curving. In example embodiments, the opposite edges 60 of the slots are such that when the arms are mated over the fitting outer tapered surface, such opposite edges 60 are parallel or almost parallel to each other and are close to each other or abut each other, as for example shown in FIGS. 5B and 6B. This configuration is expected to provide better results.

Three example embodiments are provided herewith.

Example Embodiment 1

The tube end (or hoop area) portion includes constant width slots as for example shown in FIG. 4A. The width of each slot is based on the reduced circumference at the distal end of the tube when the tube is mated to the fitting end and the number of slots used. The proximal ends of the slots may incorporate a radius at each corner to reduce stress concentrations.

In this example embodiment, each slot width is defined by the difference of the circumference along the fitting taper divided by the number of slots. The length of the slot may vary based on material properties and design requirements, though in most cases the proximal end of the slot will be close to, or at, the point at which the proximal end of the taper on the fitting is located. The open volume left after forming between the opposite edges 60 of each slot may be filled with a filler material such as structural adhesive, or left open.

The width of the each slot is W=(Cmax−Cmin)/N [Formula 1], where,

W=width, $C_{max}$=Maximum circumference of fitting tapered outer surface, at its largest diameter, (and by association in an example embodiment, the original inner surface diameter of the tube), $C_{min}$=Minimum circumference of the tapered outer surface, at its smallest diameter, (and by association in an example embodiment, the post-formed circumference of the inner surface diameter of the tube at the distal edge), and N=number of slots around the circumference.

In an example embodiment, the width of each slot can be a value within 25% of W derived by Formula 1. In another example embodiment, the width of each slot can be within 20% of W derived by Formula 1. In yet another example embodiment, the width of each slot can be within 15% of W derived by Formula 1. In another example embodiment, the width of each slot can be a value within 10% of W derived by Formula 1. In a further example embodiment, the width of each slot can be within 5% of W derived by Formula 1. As is well known in the art, circumference is calculated by multiplying the diameter by Tr.

Example Embodiment 2

The tube end portion is formed with linearly varying width slots, as for example shown in FIG. 5A. The slots are shaped such that when mated over the single angle tapered outer surface section of the fitting, the two opposite edges of each slot generally parallel or parallel to each other and meet or abut each other along the entire length of the slot.

The slots are triangular in shape in plan view, with the point of the "V" or point of the triangle pointing towards the proximal end of the tube, and the distal end of the slot, which is the widest end of the slot, being at the distal end of the tube.

The length of the slot may vary based on material properties and design requirements, though in example embodiments the proximal end of the slot will be close to the point at which the proximal end of the tapered outer surface of the fitting is located.

In this example embodiment, each slot is approximately an isosceles triangle with the base defined as the slot max width (W) at the distal end 56 of the tube and the angle bisector from the vertex 52 (i.e. the "V") of the triangle to the base 54 defined as the slot length (L). In this regard, when the arms are bent and fitted over the fitting tapered outer surface, the opposite edges of each slot are very close together or they abut each other.

In example embodiments where the opposite edges 60 of each of the slots do not abut each other after being mated to the fitting outer surface, the open volume left after forming may be filled with a filler material such as structural adhesive, or left open.

The proximal end of the slot is the theoretic point at which the two angled opposite edges defining each slot meet. In example embodiments, the physical end of the slot may not be precisely at this point due to manufacturing limitations, and/or to reduce stress concentrations.

The slot width $W_X$ varies linearly as a function of a distance "X" from the proximal apex and is $W_X$=W−2*X*tan(Θ) (Formula 2), where, W for the distal edge of the slot is calculated using Formula 1, Θ=angle between the two sides of the slot, and Θ=2*tan$^{-1}$ (LW/2).

L=length of each slot.

In an example embodiment, the width Wx at a distance X of each slot can be within 25% of Wx derived by Formula 2. In another example embodiment can be within 20% of Wx derived by Formula 2. In yet another example embodiment it can be within 15% of Wx derived by Formula 2. In another example embodiment, it can be within 10% of Wx derived by Formula 2. In a further example embodiment it can within 5% of Wx derived by Formula 2.

Example Embodiment 3

Figure 6A:
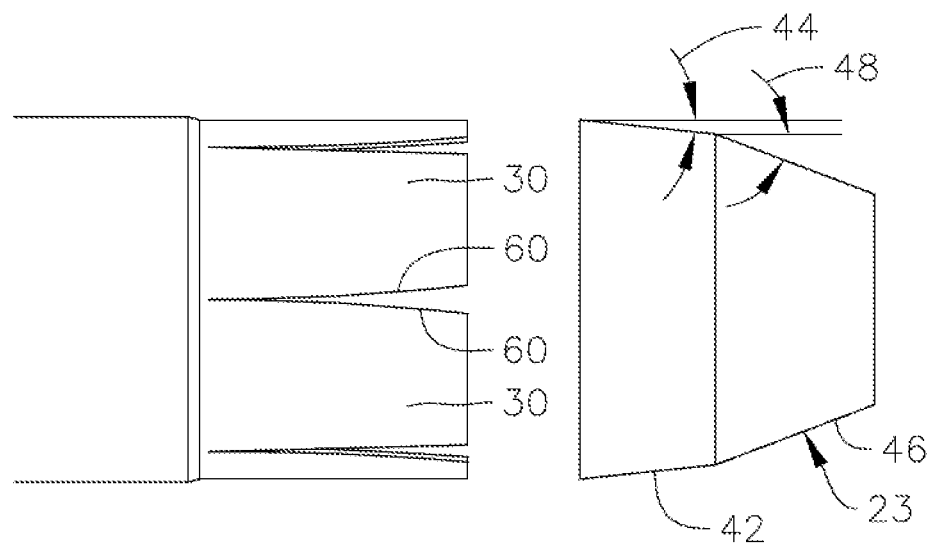
FIG. 6A is a schematically depicted side exploded view of an example embodiment slotted tube end portion and partially depicted fitting having two sequentially tapered sections.
Figure 6B:
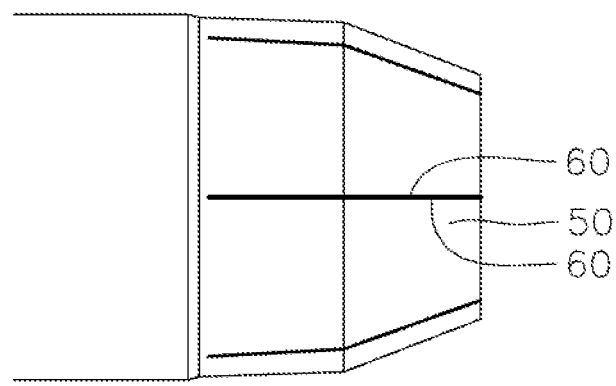
FIG. 6B is a schematically depicted side view of the tube end portion shown in FIG. 6A when mated to a tapered outer surface of a fitting.

The end portion area has non-linearly varying width slots as for example shown in FIG. 6A. The slots are shaped such that when formed over a varying angle tapered outer surface of a fitting, the two sides of the slot nearly meet or abut each other along the entire length of the slot. In example embodiments where the opposite edges 60 of each of the slots do not abut each other after being mated to the fitting outer surface, the open volume left after forming may be filled with a filler material such as structural adhesive, or left open.

After machining and prior to forming, the slots are shaped based on the radial projection of the varying taper angle of the tapered outer surface of the fitting, which may result in a polygonal or curved slot shape.

The slot width $W_X$ varies as a function of a distance "X" from the proximal apex of the slot and is $W_X = (C_{max} - C_X)/N$ (Formula 3), where, $C_{max}$=Maximum circumference of fitting tapered outer surface (and by association in an example embodiment, original inner surface diameter of the tube), $C_X$=the circumference of the formed profile at a distance "X" from the proximal apex, and N=number of slots around the circumference.

In an example embodiment, the width Wx at a distance X of each slot is within 25% of the Wx derived by Formula 3. In another example embodiment it is within 20% of Wx derived by Formula 3. In yet another example embodiment it is within 15% of Wx derived by Formula 3. In another example embodiment, it is within 10% of Wx derived by Formula 3. In a further example embodiment it is within 5% of Wx derived by Formula 3.

Applicant had discovered that after mating the tube end 27 to the fitting tapered outer surface there may be micro-buckling of the tube formed in a direction radially away from the fitting at in location 76 proximate the end of the fitting opposite the flange 22 of the fitting, when the tube end is cured over the fitting. Such micro-buckling may also occur during use of the composite tube assembly. Applicants discovered they can overcome this problem by forming an annular a step, or steps, 78 on the outer surface of the fitting at the end opposite the flange, as for example shown in FIGS. 7A and 7B. In an example embodiment, a first step 78a is provided by reducing the outer diameter of the fitting. In another example embodiment, multiple steps 78 are provided by having a first diameter reduction then followed by a second diameter reduction distally towards the end opposite the flange to create another step, followed by a third diameter reduction and so forth, as for example shown in FIGS. 7A and 7B. Although one diameter reduction is necessary, multiple diameter reductions may be provided as described herein.

An annular step 80 is provided on the inner surface of the tube end portion prior proximate the tube end. This annular step may be formed by decreasing the inner surface diameter of the tube by removing tube material from the inner surface of the tube or by forming the tube to have such step. The annular step 80 formed on the tube is such that when the tube mates with the outer surface of the fitting, the annular step 78 of the fitting mates with the step 80 of the tube. In an example embodiment, by providing the fitting with multiple steps, the same fitting can be used to accommodate tubes having different tube wall thicknesses. For example, in the embodiment shown in FIG. 7B, three different thicknesses of tubes may be accommodated with a single fitting. In other example embodiments, the tube inner surface may have multiple annular steps complementary to any plurality of annular steps 78 defined on the fitting.

While the description herein has been made in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms may have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present there between. Moreover, when a component is referred to as being "coupled" to another component, it can be directly attached to the other component or intervening components may be present there between.

What is claimed is:

1. A method for forming a composite tube assembly comprising:
   obtaining a composite tube comprising an end, wherein said composite tube is formed from fibers and resin, said tube comprising an end portion extending to the end comprising a plurality of axial slots, wherein each of the axial slots comprises two edges at an outer surface of the said tube end extending along the length each slot, wherein said slots define a plurality of arms on said end portion;
   obtaining a fitting comprising a first end opposite a second end, said fitting comprising an annular tapered outer surface tapering from a first diameter at, or proximate, the first end to a second diameter, wherein the first diameter is greater than the second diameter;
   placing the tapered outer surface of the fitting in the tube end portion such that second diameter of the fitting tapered outer surface is at, or proximate, the end of the tube and the first diameter of the fitting tapered outer surface is further into the tube than the second diameter of the fitting tapered outer surface;

radially compressing each of the arms over the fitting annular tapered outer surface, wherein the two edges of each slot do not overlap each other; and connecting or adhering each of the arms to said fitting tapered outer surface, wherein after said adhering, each slot is triangular in plan view and a width of each slot decreases in a direction toward the end of the tube.

2. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W can be calculated by the formula $W=(C_{max}-C_{min})$ N, wherein $C_{max}$ is the maximum circumference of the fitting tapered outer surface at the first diameter, $C_{min}$ is the minimum circumference of the tapered outer surface at the second diameter, and N is the number of slots.

3. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W is within of 25% of a width, $W_c$ calculated by the formula $W_c=(C_{max}-C_{min})/N$, wherein $C_{max}$ is the maximum circumference of the fitting tapered outer surface at the first diameter, $C_{min}$ is the minimum circumference of the tapered outer surface at the second diameter, and N is the number of slots.

4. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W is within of 20% of a width, We calculated by the formula $W_c=(C_{max}-C_{min})/N$, wherein $C_{max}$ is the maximum circumference of the fitting tapered outer surface at the first diameter, $C_{min}$ is the minimum circumference of the tapered outer surface at the second diameter, and N is the number of slots.

5. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W is within of 15% of a width, We calculated by the formula $W_c=(C_{max}-C_{min})/N$, wherein $C_{max}$ is the maximum circumference of the fitting tapered outer surface at the first diameter, $C_{min}$ is the minimum circumference of the tapered outer surface at the second diameter, and N is the number of slots.

6. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W is within of 10% of a width, We calculated by the formula $W_c=(C_{max}-C_{min})/N$, wherein $C_{max}$ is the maximum circumference of the fitting tapered outer surface at the first diameter, $C_{min}$ is the minimum circumference of the tapered outer surface at the second diameter, and N is the number of slots.

7. The method as recited in claim 1, wherein the width, $W_x$ of each slot of said plurality of slots as a function of length, X is calculated by the formula $W_x=W-2*X*\tan(\Theta)$, wherein W is a width at a distal edge of the slot, $\Theta$ is the angle between the two opposite edges of said slot and can be calculated by the formula $\Theta=2*\tan^{-1}(LW/2)$, wherein L is a length of the slot, and wherein W is within of 5% of a width, We calculated by the formula $W_c=(C_{max}-C_{min})/N$, wherein $C_{max}$ is the maximum circumference of the fitting tapered outer surface at the first diameter, $C_{min}$ is the minimum circumference of the tapered outer surface at the second diameter, and N is the number of slots.

8. A method for forming a composite tube assembly comprising:

obtaining a composite tube comprising an end, wherein said composite tube is formed from fibers and resin, said tube comprising an end portion extending to the end comprising a plurality of axial slots, wherein each of the axial slots comprises two edges at an outer surface of the said tube end extending along the length each slot, wherein said slots define a plurality of arms on said end portion;

obtaining a fitting comprising a first end opposite a second end, said fitting comprising an annular tapered outer surface tapering from a first diameter at, or proximate, the first end to a second diameter, wherein the first diameter is greater than the second diameter;

placing the tapered outer surface of the fitting in the tube end portion such that second diameter of the fitting tapered outer surface is at, or proximate, the end of the tube and the first diameter of the fitting tapered outer surface is further into the tube than the second diameter of the fitting tapered outer surface;

radially compressing each of the arms over the fitting annular tapered outer surface, wherein the two edges of each slot do not overlap each other; and connecting or adhering each of the arms to said fitting tapered outer surface, wherein a width, $W_x$ of each slot of said plurality of slots as a function of its length, X is calculated by the formula $W_x=(C_{max}-C_x)/N$, wherein $C_{max}$ is the maximum outer surface circumference of the tapered outer surface of the fitting, Cx is a circumference of the fitting at a distance X as measured from the proximal apex of the slot when the fitting is properly fitted within the tube and N is the number of slots.

9. A method for forming a composite tube assembly comprising:

obtaining a composite tube comprising an end, wherein said composite tube is formed from fibers and resin, said tube comprising an end portion extending to the end comprising a plurality of axial slots, wherein each of the axial slots comprises two edges at an outer surface of the said tube end extending along the length each slot, wherein said slots define a plurality of arms on said end portion;

obtaining a fitting comprising a first end opposite a second end, said fitting comprising an annular tapered outer surface tapering from a first diameter at, or proximate, the first end to a second diameter, wherein the first diameter is greater than the second diameter;

placing the tapered outer surface of the fitting in the tube end portion such that second diameter of the fitting tapered outer surface is at, or proximate, the end of the tube and the first diameter of the fitting tapered outer surface is further into the tube than the second diameter of the fitting tapered outer surface;

radially compressing each of the arms over the fitting annular tapered outer surface, wherein the two edges of each slot do not overlap each other; and connecting or adhering each of the arms to said fitting tapered outer surface, wherein a width, $W_x$ of each slot of said plurality of slots as a function of its length, X is within 25% of a width $W_c$ calculated by the formula $W_c=(C_{max}-C_x)/N$, wherein $C_{max}$ is the maximum outer surface circumference of the tapered outer surface of the fitting, Cx is a circumference of the fitting at a distance X as measured from the proximal apex of the slot when the fitting is properly fitted within the tube and N is the number of slots.

10. The method as recited in claim 9, wherein the width, $W_x$ of each slot of said plurality of slots as a function of its length, X is within 20% of the width $W_c$.

11. The method as recited in claim 9, wherein the width, $W_x$ of each slot of said plurality of slots as a function of its length, X is within 15% of the width $W_c$.

12. The method as recited in claim 9, wherein the width, $W_x$ of each slot of said plurality of slots as a function of its length, X is within 10% of the width $W_c$.

13. The method as recited in claim 9, wherein the width, $W_x$ of each slot of said plurality of slots as a function of its length, X is within 5% of the width $W_c$.

14. A method for forming a composite tube assembly comprising:

obtaining a composite tube comprising an end, wherein said composite tube is formed from fibers and resin, said tube comprising an end portion extending to the end comprising a plurality of axial slots, wherein each of the axial slots comprises two edges at an outer surface of the said tube end extending along the length each slot, wherein said slots define a plurality of arms on said end portion;

obtaining a fitting comprising a first end opposite a second end, said fitting comprising an annular tapered outer surface tapering from a first diameter at, or proximate, the first end to a second diameter, wherein the first diameter is greater than the second diameter;

placing the tapered outer surface of the fitting in the tube end portion such that second diameter of the fitting tapered outer surface is at, or proximate, the end of the tube and the first diameter of the fitting tapered outer surface is further into the tube than the second diameter of the fitting tapered outer surface;

radially compressing each of the arms over the fitting annular tapered outer surface, wherein the two edges of each slot do not overlap each other; and connecting or adhering each of the arms to said fitting tapered outer surface, wherein the fitting comprises at least one annular step at, or proximate, the first end of the fitting, and wherein the tube comprises an inner surface comprising an annular step, the method further comprising mating the tube inner surface annular step to the fitting at least one annular step.

15. The method as recited in claim 14, wherein said fitting at least one annular step is a plurality of adjacent steps.

16. A method for forming a composite tube assembly comprising:

obtaining a composite tube comprising an end, wherein said composite tube is formed from fibers and resin, said tube comprises an end portion extending to the end, wherein the tube comprises an inner surface comprising an annular step;

obtaining a fitting comprising a first end opposite a second end, said fitting comprising an annular tapered outer surface tapering from a first diameter at, or proximate, the first end to a second diameter, wherein the first diameter is greater than the second diameter, wherein the fitting comprises at least one annular step at, or proximate, the first end of the fitting;

placing the fitting annular tapered outer surface in the tube end portion such that the tube inner surface annular step is mated to the fitting at least one annular step and the second diameter of the fitting annular outer surface is at, or proximate, the end of the tube and the first diameter of the fitting annular tapered outer surface is further into the tube than the second diameter of the fitting annular tapered outer surface;

radially compressing the end portion of the tube over the fitting annular tapered outer surface; and connecting or adhering the radially compressed end portion of the tube to said fitting tapered outer surface.

17. The method as recited in claim 16, wherein said fitting at least an annular step is a plurality of adjacent steps.

* * * * *

UNITED STATES PATENT AND TRADEMARK OFFICE
CERTIFICATE OF CORRECTION

PATENT NO. : 11,788,652 B2
APPLICATION NO. : 16/601477
DATED : October 17, 2023
INVENTOR(S) : Justin Edward Gill et al.

It is certified that error appears in the above-identified patent and that said Letters Patent is hereby corrected as shown below:

In the Claims

In Column 11, Line 17, in Claim 2, delete "$W=(C_{max}-C_{min}) N$" and insert -- $W=(C_{max}-C_{min})/N$ --.

In Column 11, Line 41, in Claim 4, delete "$W_e$" and insert -- $W_c$ --.

In Column 11, Line 53, in Claim 5, delete "$W_e$" and insert -- $W_c$ --.

In Column 11, Line 65, in Claim 6, delete "$W_e$" and insert -- $W_c$ --.

In Column 12, Line 10, in Claim 7, delete "$W_e$" and insert -- $W_c$ --.

Signed and Sealed this
Thirtieth Day of January, 2024

Katherine Kelly Vidal
*Director of the United States Patent and Trademark Office*